(12) United States Patent
Griegel et al.

(10) Patent No.: US 8,567,669 B2
(45) Date of Patent: Oct. 29, 2013

(54) METHOD AND APPARATUS FOR A MERCHANT PROFILE BUILDER

(75) Inventors: David Griegel, San Diego, CA (US); Linyu Yang, San Diego, CA (US); Danfeng Li, San Diego, CA (US); Bo Zhang, San Diego, CA (US); Joseph Milana, San Diego, CA (US); Zuohua Zhang, Bellevue, WA (US); Gregory Gancarz, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 1478 days.

(21) Appl. No.: 11/677,517

(22) Filed: Feb. 21, 2007

(65) Prior Publication Data

US 2007/0203732 A1 Aug. 30, 2007

Related U.S. Application Data

(60) Provisional application No. 60/776,270, filed on Feb. 24, 2006.

(51) Int. Cl.
*G06K 5/00* (2006.01)
(52) U.S. Cl.
USPC ............... 235/380; 235/379; 705/35; 705/44
(58) Field of Classification Search
USPC ................ 235/375, 379, 380; 705/35, 38, 75
See application file for complete search history.

(56) References Cited

U.S. PATENT DOCUMENTS

| 5,819,226 | A | * | 10/1998 | Gopinathan et al. | 705/44 |
| 7,251,624 | B1 | * | 7/2007 | Lee et al. | 705/35 |
| 2002/0099649 | A1 | * | 7/2002 | Lee et al. | 705/38 |
| 2003/0033228 | A1 | * | 2/2003 | Bosworth-Davies et al. | 705/35 |
| 2004/0034604 | A1 | * | 2/2004 | Klebanoff | 705/65 |
| 2007/0106582 | A1 | * | 5/2007 | Baker et al. | 705/35 |

* cited by examiner

*Primary Examiner* — Christopher Stanford
(74) *Attorney, Agent, or Firm* — Mintz Levin Cohn Ferris Glovsky and Popeo, P.C.

(57) ABSTRACT

A merchant profile builder (MPB) is provided. The complete merchant profiling process is split into three pieces: Data Preprocessing, Weekly Summary Calculation, and Merchant Profile Calculation. In the Data Preprocessing stage, authorization data and daily fraud data are processed on a weekly basis to yield: an authorization extract file and fraud authorization data, each of which are sorted by a merchant key. In the Weekly Summary Calculation stage, the files output by the Data Preprocessing stage are used as input to compile basic statistics for each merchant based only on data for one week. There are separate weekly summaries for authorizations and fraud authorizations. In the Merchant Profile Calculation stage, the weekly summaries from the 16 most recent weeks are combined together and averages are calculated and output a set of merchant profiles and a set of default profiles.

15 Claims, 2 Drawing Sheets

Fig. 1

METHOD AND APPARATUS FOR A MERCHANT PROFILE BUILDER

CROSS-REFERENCE TO RELATED APPLICATIONS

This application claims benefit of U.S. Provisional Patent Application Ser. No. 60/776,270, filed on Feb. 24, 2006, which application is incorporated herein in its entirety by this reference thereto. This application is related to U.S. Pat. No. 6,330,546, entitled "Risk Determination and Management Using Predictive Modeling and Transaction Profiles for Individual Entities," granted Dec. 11, 2001, which is a Continuation of Ser. No. 07/941,971, filed Sep. 8, 1992, entitled "Fraud Detection Using Predictive Modeling," now U.S. Pat. No. 5,819,226, granted Oct. 6, 1998, which patents are incorporated herein in their entirety by this reference thereto.

BACKGROUND OF THE INVENTION

1. Technical Field

The invention relates to fraud prediction on a computer network. More particularly, the invention relates to a method and apparatus for a merchant profile builder that is used in predicting fraud in credit card transactions worldwide.

2. Description of the Prior Art

In the following discussion, the term "credit card" is used for illustrative purposes; however, the techniques and principles discussed herein apply to other types of customer accounts, such as charge cards, bank automated teller machine cards, debit cards, telephone calling cards, and the like.

Frequently, credit card issuers conventionally attempt to limit fraud losses by immediately closing a customer's account upon receiving a report that the card has been lost or stolen. Typically, the customer's credit information is then transferred to a new account and a new card is issued. This procedure is only effective in limiting fraudulent use of lost or stolen or counterfeit cards after the loss or theft has been reported to the issuer.

Fraud detection models have been developed and enhanced over time to improve credit card fraud detection. For example, Fair Isaac Corporation's line of Falcon™ products uses information from the transaction as well as cardholder profiles in the various predictive models to assess fraud risk. However, in any sort of transaction, there are actually two parties involved at the point of transaction as a point of sale. One is the cardholder and the other is the merchant. So, if fraud detection techniques incorporate cardholder profiles, then why not develop and incorporate merchant profile technology as well?

Therefore, it would be advantageous to develop and use merchant profiles consisting of merchant profile informational data to improved credit card fraud detection.

SUMMARY OF THE INVENTION

A merchant profile builder (MPB) is provided. The complete merchant profiling process is split into three pieces: Data Preprocessing, Weekly Summary Calculation, and Merchant Profile Calculation. In the Data Preprocessing stage, authorization data and daily fraud data are processed on a weekly basis to yield: an authorization extract file and fraud authorization data, each of which are sorted by a merchant key. In the Weekly Summary Calculation stage, the files output by the Data Preprocessing stage are used as input to compile basic statistics for each merchant based only on data for one week. There are separate weekly summaries for authorizations and fraud authorizations. In the Merchant Profile Calculation stage, the weekly summaries from the 16 most recent weeks are combined together and averages are calculated and output in a set of merchant profiles and a set of default profiles.

DETAILED DESCRIPTION OF THE INVENTION

A Merchant Profile Builder (MPB) method and apparatus is provided. The system and method is discussed herein at times from a modeling perspective and from a fraud predictor analyst's perspective.

In any sort of transaction, there are two parties involved at the point of transaction, such as a point of sale. One is the cardholder and the other is the merchant. Therefore, the preferred embodiment of the invention determines fraud detection by using cardholder profile informational data and merchant profile informational data. For example, if there is a fraudster who makes a living from credit card fraud, that person may very well go to the same merchants over and over again. So, therefore, the merchant's profile should be able to capture this behavior and provide a bit of a jump-start on detecting fraud.

With a merchant profile, the preferred embodiment of the invention obtains credit card data from an Association of issuers that has the authorization data and fraud accounts. When the fraudster returns to the same merchant, the merchant profile has some knowledge of that. In this way, with a merchant profile, the fraud detection process gets a head start on detecting fraud.

With the preferred embodiment of the invention, the merchant profile builder (MPB), an agreement is made between an Association of issuers, e.g. MasterCard, VISA, etc., and the host of an MPB, such as Fair Isaac Corporation, for example. The MPB receives authorization data from the Association on a daily basis for use to build the merchant profiles. Also received are fraud reports, hence, from the combination of the authorization data and the fraud reporting data, quantities are calculated which make the merchant profiles. The process also includes a weekly update step where each week, the merchant profile is shipped out to the fraud predictor customer, such as an individual issuer. In another embodiment of the invention, the merchant profile is shipped to a processor for further processing. In another embodiment of the invention, the merchant profile is stored on an external host site and as such is available to run in ASP mode as part of a hosted service.

In the preferred embodiment of the invention, the merchant profile is merged with a fraud prediction system, such one of the systems from the Falcon™ products. In this way, every transaction is scored in real-time. As the credit card purchase is occurring, it is scored with the enhanced information of the merchant profile, in addition to the cardholder profile. New models were built to incorporate the merchant profile information. Cross-profiles are used to show additional views of how the consumer is spending. Cross-profiles merge in and explicitly take into account the historical behavior derived from the merchant that the consumer is visiting.

One embodiment of the MPB provides merchant profiles that are more robust and indicative of fraud risk than currently on the market. For example, one of the problems existing in other merchant profile builders is that they do not adequately make use of merchant geographic information. One embodiment of the invention provides a solution that incorporates merchant geographic informational data and is outlined hereinbelow. Such solution includes implementing a particular merchant profile look-up procedure when an exact match is not found and a default is needed. In particular, one embodiment of the MPB introduces Merchant Category Code (MCC)-Merchant Country defaults.

MPB Features

The preferred embodiment of the invention contains merchant profile variables that are intensive variables, meaning that the value of a variable is independent of the size of the merchant. This includes variables such as fraud rate, i.e. fraction of transactions that are fraud, pick-up rate, i.e. fraction of transactions that have a pick-up response code, and average transaction amount. Intensive variables are very suitable for use in merchant profiles that are used to assess fraud risk for a payment card. It has been found that other embodiments of the invention included extensive variables, i.e. quantities that depend on the size of the merchant.

In the preferred embodiment of the invention, MPB profile variables keep the focus on fraud. In another embodiment of the invention, MPB included variables such as fraud rate and keyed rate, i.e. proportion variables. A fraud risk can be inferred from the keyed rate of a merchant, but unfortunately the relation between the two tends to vary with time. For example, Internet merchants, whose transactions are 100 percent keyed, used to have a higher fraud rate than they now do. In the preferred embodiment of the invention, fraud rate and keyed rate are replaced with conditional fraud rates such as the fraud rate for keyed transactions and the fraud rate for nonkeyed transactions. The preferred embodiment of the invention provides a stable system and method wherein all the variables are defined to be less sensitive to changes in the environment. The preferred embodiment of the invention determines and uses separate fraud rates for separate, characteristics, such as, for example, keyed, swiped, and cross-border, i.e. when the cardholder and merchant country codes are not the same.

In the preferred embodiment of the invention, fraud rates are calculated more accurately. Another embodiment of the invention defines a fraud window, e.g. a 15-day fraud window, for each fraud account beginning with the date of first fraud, and all authorizations occurring during that window are tagged as fraud. Although this method of tagging is appropriate when cardholders are going to be contacted to verify charges, it may not be appropriate for determining merchant risk. The preferred embodiment of the invention uses the transaction-level information in the fraud data to find matching authorizations. Details of the tagging process according to one embodiment of the invention can be found hereinbelow in the section, "Fraud Tagging."

Seasonal biases are addressed in the preferred embodiment of the invention. In another embodiment of the invention, fraud rates are calculated by dividing the average number of fraud authorizations reported per week, i.e. based on the windowing described above, by the average number of authorizations per week. Due to the typical delay between a fraud being perpetrated and reported, one might expect, for example, most of the fraud counts reported in January to have transaction dates in December. Thus the numerator and denominator used in fraud rate calculations are not based on events taking place at the same time. In January, the number of fraud counts reported is inflated by the higher number of frauds that occur in December, hence fraud rates are systematically high. Similarly, in one embodiment of the invention, fraud rates in December tend to be low because the fraud counts usually have not yet caught up to the increased authorization volume. In the preferred embodiment of the invention, the system and method synchronizes the authorizations and fraud authorizations based on their transaction dates, and the fraud authorization count in the numerator and the authorization count in the denominator come from the same time period. In the preferred embodiment of the invention, fraud rates are calculated by when the fraud occurred rather than when it is reported. Basically, calculations are based on transaction date.

In the preferred embodiment of the invention, geographic information is used in default profiles and in merchant profiles. For example, MPB makes use of the merchant country code and the cardholder country code. If a profile for a merchant is not found, another embodiment of the invention uses a default based on the merchant category code (MCC). The preferred embodiment of the invention uses a default based on MCC and merchant country code. For some MCC's, cardholder behavior is very different from one country to another, hence this refinement is important. Also, merchant profiles take on different values for cross-border and domestic transactions.

Profiles are basically running averages of selected quantities, and one embodiment of the invention gives strongest weight to the most recent week and exponentially suppresses the contributions of prior weeks. The preferred embodiment of the invention gives equal weight to data from the 16 most recent weeks; older weeks are removed, excluded, i.e. aged off. This is consistent with how fraud rates are calculated hereinabove. Because fraud reporting is not complete in recent weeks, it is not desirable to weight recent weeks more strongly than older weeks. A byproduct of this approach is that profiles for inactive merchants automatically age out of the system with this preferred embodiment of the invention, while aging off inactive merchants is a manual process in the other embodiment of the invention.

In the preferred embodiment of the invention, authorizations are segmented into eight segments based on whether they are cross border or domestic, i.e. obtained by comparing the merchant country code to the issuer country code, based on whether they are card present or card not present, and based on the point-of-service entry mode. These segmentations contribute to what is referred to herein as the conditional fraud rates. Independent sets of statistics are calculated for the individual segments. The segments are:

Cross border, card not present;
Cross border, card present;
Domestic, card not present;
Domestic, card present, chip entry mode;
Domestic, card present, swiped entry mode without PIN;
Domestic, card present, swiped entry mode with PIN;
Domestic, card present, chip fallback entry mode; and
Domestic, card present, keyed or unknown entry mode.

In order to keep the overall merchant profile size the same as for both embodiments of the invention, an adaptive segmentation, i.e. a compression technique, is employed in the preferred embodiment of the invention in which the profile variables for just the top four most popular segments are included in the merchant's profile. It has been found that only about one percent of the transactions are missed by eliminating data from all but the top four segments. Put another way, it has been found that the top four out of eight segments captures 99% of the transactions. In one embodiment of the invention, the top four segments are identified as those segments that have the greatest number of transactions. As well, a segmentation indicator is passed as one of the profile variables that communicates to the model which segments are present and in which slots they reside.

The preferred embodiment of the invention includes the MCC-merchant-country default as part of each merchant profile. This enables easy comparison between a merchant and the average merchant in its category within a model. For example, given an individual merchant and one of the segments is cross-border card-present, then the preferred embodiment of the invention provides a cross-border card-present default profile. That default is calculated for that same merchant category code and that same merchant country code.

The preferred embodiment of the invention provides a moderating mechanism, for example, to moderate runaway transactions. Basically, outliers are eliminated. For example, an account may experience 100 declines, that is, where the same merchant is declining a card 100 times in a row in just one day.

The preferred embodiment of the invention provides bounds on how many declines the system and method analyzes. For example, if the same transaction is attempted over and over again, such repeating transactions are counted only once. Hence, the preferred embodiment of the invention provides protection against such types of outlier events.

Overview

In one embodiment of the invention, MPB is not a statistical model; it does not for example use a neural network. However, the output of the MPB can be used as input into a fraud detection system and method which itself may incorporate a type of predictive model. The output of MPB can be described as merchant risk tables, which are updated every week based on the latest authorization and fraud data from one or more financial institutions or from an Association of such institutions. An example of a financial institution is a lending institution and an example of an Association of such institutions is an Association of lenders. One challenge of MPB is in processing the full volume of data, e.g. the Association data. In this embodiment of the invention, merchant profile calculations, like risk table calculations, can be quite simple. Thus the emphasis should be on a system and method that processes transactions as quickly as possible, possibly at the expense of having variable calculations, even simple calculations, hard coded in the software.

In the preferred embodiment of the invention, the complete merchant profiling process is split into three pieces: 1) Data Preprocessing, 2) Weekly Summary Calculation, and 3) Merchant Profile Calculation.

Figure 1:
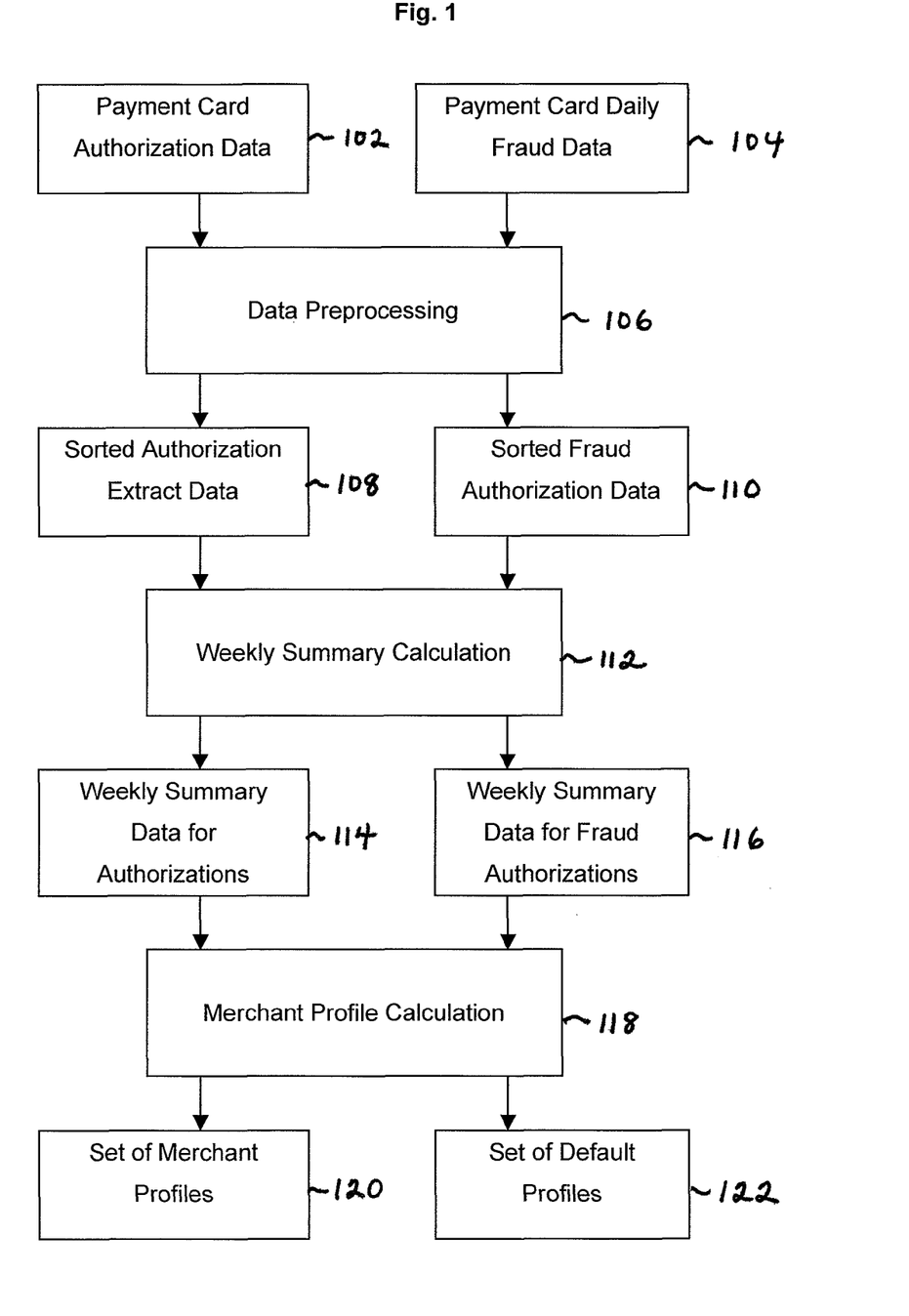
FIG. 1 is a flow diagram showing the merchant profile builder process according to the invention.

Referring to FIG. 1, in the Data Preprocessing stage 106, Payment Card Association authorization data 102 and Payment Card daily Fraud data 104 are processed 106 on a weekly basis to yield: 1) an authorization extract file that is sorted by merchant key 108 and 2) fraud authorization data, e.g. in one or more files, that are sorted by merchant key 110. The fraud authorization files consist of those authorizations that match the transactions in the daily Fraud files. It should be appreciated that daily Fraud files data are described in further detail hereinbelow. An authorization data set is a data file containing the detailed information of the electronic communications for all attempted Payment Card purchases made in a given time frame.

In the Weekly Summary Calculation stage 112, the files output by the Data Preprocessing stage 106 are used as input to compile basic statistics for each merchant. The statistics are based only on the authorizations and fraud authorizations for one week. There are separate weekly summaries for authorizations 114 and fraud authorizations 116.

In the Merchant Profile Calculation stage 118, the weekly summaries from the 16 most recent weeks are combined together and averages are calculated. The output from this stage consists of a set of merchant profiles 120 as well as a set of default profiles 122.

Merchant Keys

Figure 2:
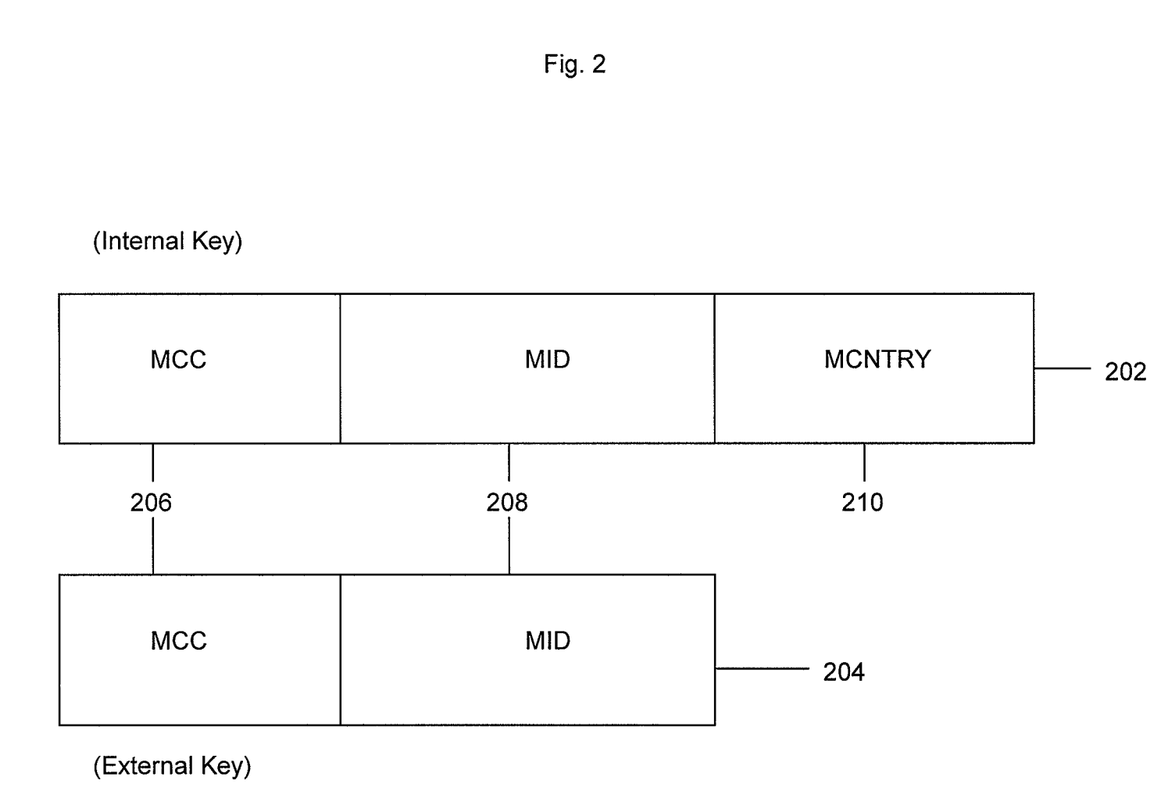
FIG. 2 is a schematic block diagram showing an internal merchant profile builder key and an external merchant profile builder key according to the invention.

Typically, fraud predictor models identify merchants by a merchant key. The preferred embodiment of the invention provides a slight change in the typical merchant key, as described with reference to FIG. 2. The preferred embodiment provides and distinguishes between an internal key and an external key. The internal key 202 is used to identify merchants internally, i.e. prior to the construction of a final merchant profile set, and consists of the concatenation of three fields: Merchant Category Code (MCC) 206, Merchant ID (MID) 208—also known as Card Acceptor ID—and Merchant Country Code (MCNTRY) 210. The external key 204 is used to identify merchants externally, i.e. for the final merchant profile set shipped to customers and is the concatenation of MCC 206 and MID 208.

Merchant Profile Look-up Logic

According to the preferred embodiment of the invention, fraud predictor models employing the invention require the following merchant profile look-up logic. The first look-up attempts an exact match to the external merchant key. If that fails, an MCC-MCNTRY default look-up occurs. In one embodiment of the invention, such look-up is implemented by using an MID of "MCNTRY=nnn" with an appropriate number of trailing space characters, where nnn denotes the merchant country code. If the MCC-MCNTRY look-up fails, then a global default merchant profile look-up take places.

Week90

Week90 is a concept used to keep track of which week's data is being processed by the invention and is employed in certain embodiments hereinbelow in further detail. Day90 measures how many days have elapsed since Jan. 1, 1990. Jan. 1, 1990 has day90=0, Jan. 2, 1990 has day90=1, etc. Week90 is the integer part of day90 divided by 7.

Exemplary Data Preprocessing

Following is a description of an exemplary data preprocessing technique according to the preferred embodiment of the invention. It should be appreciated that one of ordinary skill in the art can and should discern that specific details are by way of example only and are not meant to be limiting.

General Considerations

In the preferred embodiment of the invention, all files are read as if they are binary data. Records with "incorrect" record length are repaired by changing extraneous new-line characters within a record to spaces and by changing a byte that should be a new-line character at the end of a record to a new-line character. These records must not be thrown away. Additional instructions for cleaning and sanity checking the fields that are used by the MPB are given below.

Encryption of all data is checked before it is input into the system. The account number checksum is computed for the first 1000 records of every file used, and 90% of the accounts should fail the checksum if the accounts have been encrypted.

Fraud Daily File Data Pool

Frauds are received each day in the form of a daily Fraud file. Daily Fraud files received from the Association provide records for all fraud transactions reported to the Association. The daily Fraud file data typically provides the following fields:

Add/change/delete (A/C/D) indicator (1 byte);
Issuer ID (7 bytes);
Audit control number (15 bytes);
Account number (19 bytes); and
Transaction date (8 bytes).

Also implicit in each record is the date the file was received at the host site, such as Fair Isaac Corporation. This date is referred to as the file date, and it can be extracted from the name of the daily Fraud file. The combination of an issuer Identification number and audit control number is referred to as the fraud tracking number in the discussion herein. The Fraud data pool consists of one year's worth of daily Fraud files, such as 365 or 366 files, depending on whether there is a February 29 file. When a new weekly file is added to the pool, the oldest file is removed.

Daily Fraud Files Data Rejection Criteria

Records with an add/change/delete indicator with values other than A, C, and D are rejected.

Records with issuer identification number or audit control number consisting of blanks or zeros are rejected.

Reject records with account numbers that do not belong to the Association whose data is being used for building profiles.

Records with account numbers that are nondigit are rejected; trailing spaces are okay.

Records with invalid transaction dates are rejected.

Daily Fraud File Data Processing

To process the daily Fraud file data for the merchant profile update at the end of week90=n, a year's worth of daily Fraud file data with file dates up to and including day90=7n+6 are collected together. Add, change, and delete records are processed based on the fraud tracking number. Common sense rules apply:

Fraud tracking numbers with just an add should be treated as an add.

Fraud tracking numbers with just a change should be treated as an add.

Fraud tracking numbers with just a delete should be ignored.

Fraud tracking numbers with an add and change should use the information in the change record if the change is from the same or later file date as the add. Otherwise use the add record.

Fraud tracking numbers with an add and a delete, i.e. from the same or later file date, should be ignored.

Fraud tracking numbers With a change and a delete, i.e. from the same or later file date, should be ignored.

Fraud tracking numbers with an add, change, and delete, i.e. from the same or later file date, should be ignored.

Fraud tracking numbers with multiple change records should use the information in the change record with the latest file date.

The output of the above paragraph is a set of records of the form:

Issuer identification number;
Audit control number;
Account number; and
Transaction date in day90 format.

The file is sorted and duplicate records removed. For illustrative purposes, the result is called mpb_rawfraud.n.

From the resulting file, obtain a list of BIN/Issuer identification number combinations. The BIN is the first six digits of the account number. Keep the most prevalent identification number for each BIN, and use that, along with the issuer identification number/issuer country table sent by the Association to obtain a BIN/Issuer Country list. In one embodiment of the invention, monthly updates to the table are received from the Association and the updated table is used in processing authorizations as soon after receipt as possible. These should be put into a file called fraudBIN.n, where n is the week90 of the merchant profile update. These are the BINs with fraud reporting along with their issuer country code. Only these BINs are used by the MPB.

The mpb_rawfraud.n file is also split into separate files based on the week90 of the transaction date, retaining only the account number and the transaction date. The resulting files are called mpb_frauds.n.m, where n is the week90 of the merchant profile update and m is the week90 of the transaction dates in the file. Only the files for the 16 most recent weeks (m=n−15 through m=n) need to be retained. Older weekly files are deleted.

Authorization Data Processing

Association authorization data may come from multiple sources. Files are received each day, possibly with multiple files from some sources, and each file is split up by the transaction date. An appropriate delay must be established to allow for the collection of all data for a given date from all data sources before processing by the MPB. Gather all authorizations with a transaction date of D after receiving all data on date D+3. For example, Tuesday's authorizations are received on Tuesday, Wednesday, Thursday, and Friday, and they are processed on Friday evening/Saturday morning.

Distinguishing Signature and PIN Transactions

Because the fraud risk associated with signature- and PIN-based transactions differs substantially, it is important to try to distinguish these two types of transactions when building and using merchant profiles. Unfortunately, none of the Association data sources may provide or correctly fill the fields needed to distinguish signature-based from PIN-based transactions, but they can be distinguished with sufficient accuracy using a simple rule. Here we are not considering chip-card transactions, which typically require a PIN. It is possible to identify chip-card transactions in all data sources based on the POS entry mode.

Authorization Extract Files

The fields chosen for extraction must be available in all chosen data sources. They are as follows:

Merchant category code (4 bytes);
Merchant (card acceptor) ID (15 bytes);
Merchant country code (3 bytes);
Primary Account Number (PAN) (19 bytes);
Transaction date (day90 format, 5 bytes);
Authorization decision indicator (1 byte);
PAN entry indicator (1 byte);
Transaction time (HHMMSS, 6 bytes);
Transaction amount in US cents (12 bytes);
Card-not-Present (CNP) indicator (1 byte);
PAN entry mode (2 bytes);
Issuer country code (3 bytes);
Data source indicator (1 byte);
POS data (11 bytes);
Response code (authorization decision) (2 bytes);
Issuer identification number (7 bytes);
Transaction type (2 bytes); and
Filler for PIN-related fields.

Because the original format of the authorization messages may not provide the transaction year, provide transaction year to the parsing codes by providing the file date (in CCYYM-MDD format) as an argument. The parsing codes can use this baseline date to assign the correct year to the transaction date of each transaction.

The issuer country code is determined from the contents of the fraudBIN file. If a BIN is not in the fraudBIN file, then the issuer country code is set to 000.

A 1-byte authorization decision indicator is introduced with the following meaning:
0 for approves;
1 for card capture or pick-up requests;
2 for declines; and
3 for all other values.

The authorization extracts from all sources for transaction dates within a given week90 are combined, sorted, and de-duped. Duplicates are to be removed in a manner discussed hereinbelow. Other rejection criteria are also described hereinbelow. The resulting authorization extract file with transaction dates during week90=n is called mpb_auths.n.

Authorization Data Cleaning

Following are criteria for authorization data cleaning:
Standardize issuer country code for Germany;
Change a leading blank in the POS entry mode to a zero;
Change a double blank in the POS entry mode to "00";
Change Response code of " " to "~~" or "99";
Change leading blanks in the MCC to zeros; and
Change leading blanks in the MCNTRY to zeros.

Authorization Duplicate Checking

Within a source, duplicates are removed based on the following criteria:
Remove transactions with a response code meaning duplicate.
Remove transactions with a duplicate value of the data-source Reference Number on the same date.
Remove transactions with a duplicate value of the data source Audit Number on the same day.

Duplicate removal for transactions seen in more than one data source is based on the following:
Deduping should be done based only on these fields: MCC, merchant ID, account number, transaction date and time, authorization decision, POS entry mode, transaction amount, and response code. One embodiment of the invention uses a fuzzy dedupe for transaction date-time, e.g. ±2 minutes, and transaction amount, e.g. ±5%, assuming the duplicates come from different data sources. A fuzzy dedupe removes as duplicates transactions that don't exactly match, but have nearly the same values. One embodiment of the invention uses fuzzification only on transaction date-time and transaction amount when looking at transactions from differing data sources.

Authorization Rejection Criteria

Following are criteria for authorization rejection:
Records with account numbers beginning with something other than a 5 or 6 are to be rejected. Also reject account numbers beginning with 59.
Records with account numbers with fewer than 13 digits are to be rejected.
Records with invalid transaction dates are to be rejected.
Records with nondigit characters in the MCC should be rejected. This assumes that any leading blanks have been changed to 0 characters. Records with MCC of 0000 should be rejected.
Records with nondigit characters in the MCNTRY should be rejected. This assumes that any leading blanks have been changed to 0 characters. Records with MCNTRY of 000 should be rejected.
Records with transaction type >=20, i.e. not cash or merchandise, should be rejected.
Reject transactions with US-cent transaction amounts that are less than 0 or so large that they do not fit into a 12-byte field.

For a given account-merchant-date combination, keep only one transaction with each non-approved, e.g. non-zero, authorization decision indicator value between approvals.

Authorization Data Pool

A 16-week pool of weekly authorization extracts is maintained. It is simplest to maintain a set of 16 weekly mpb_auths files, as this allows for easy aging off of the pool, i.e. by simply removing the oldest file each week. Once the weekly authorization extractions are constructed, as described hereinabove, there is no need to alter them.

Fraud Tagging

At the end of week n, the mpb_frauds.n.m files, i.e. m=n-15 through m=n, are constructed as discussed above, and they are used for tagging the authorizations in mpb_auths.m. The frauds files give a complete list of fraud accounts and fraud transaction dates to be used to identify the "fraud authorizations". Tagging is performed as follows:
If the combination of account number and transaction day90 from mpb_auths.m is in mpb_frauds.n.m, tag the authorization as fraud.
If the authorization is card not present, and if the combination of account number and transaction day90 plus 1 from mpb_auths.m is in mpb_frauds.n.m, tag the authorization as fraud.
If the authorization is declined, i.e. authorization decision indicator=1, and if the combination of account number and transaction day90 minus 1 from mpb_auths.m is in mpb_frauds.n.m, tag the authorization as fraud.

The authorizations that are tagged as fraud above are sorted by merchant key and merged into a single file called mpb_fraud_auths.n. It should be appreciated that the fuzzification of the transaction day90 can be modified slightly from what is discussed in the bullets hereinabove.

An Exemplary Weekly Summary Calculation

Following is a description of an exemplary weekly summary calculation technique according to the preferred embodiment of the invention. It should be appreciated that one of ordinary skill in the art can and should discern that specific details are by way of example only and are not meant to be limiting.

Weekly Summaries

The data feeds for the weekly summaries are the mpb_auths and mpb_fraud_auths feeds described hereinabove. As described hereinabove, the feed is sorted by the internal merchant key (MCC+MID+MCNTRY). The weekly summary code is given the expected week90 of the data as an argument, so it can verify that the data being input is from the expected week.

A weekly summary is created for each merchant key. The variables in a weekly summary accumulate the total number of transactions or dollars or dollars squared with specified characteristics. The characteristics can be determined by the values of fields in the merged MPB authorization and fraud authorization feeds. Segmentation is based on whether the transaction is cross border or domestic, card present or card not present, and based on POS entry mode. The segments are:
Cross border, card not present;
Cross border, card present;
Domestic, card not present;
Domestic, card present, chip entry mode;
Domestic, card present, swiped entry mode without PIN;
Domestic, card present, swiped entry mode with PIN;
Domestic, card present, chip fallback entry mode; and
Domestic, card present, keyed or unknown entry mode.

For each category, one embodiment of the invention considers only one pick-up or decline per merchant per account per day and "rejects" additional transactions on an account.

For each of the eight categories described above, the following statistics are calculated:

Total number of approved authorizations;
Total number of card-capture (pick-up) authorizations;
Total number of declined authorizations;
Total number of approved fraud authorizations (a 16-element array, with element 0 for frauds in the most recent week, element 1 for frauds from one week prior, etc.);
Total number of declined fraud authorizations (a 16-element array, as above);
Total of approved transaction amounts;
Total of approved squared transaction amounts;
Total of approved fraud transaction amounts (a 16-element array);
Total of approved squared fraud transaction amounts (a 16-element array); and
Total number of card-not-present authorizations.

An Exemplary Merchant Profile Calculation

Following is a description of an exemplary merchant profile calculation technique according to the preferred embodiment of the invention. It should be appreciated that one of ordinary skill in the art can and should discern that specific details are by way of example only and are not meant to be limiting.

Raw Merchant Profile Calculations

Merchant profiles are calculated based on the 16 most recent weekly summaries, corresponding to the authorizations currently in the authorization pool. Profiles are calculated only for merchant keys seen in the authorization pool, thus enabling a natural age-off of inactive merchants. Equal weighting of the 16 weekly summaries is to be used, except for 4-week variables, which use just the 4 most recent weeks. A raw profile is calculated for each internal merchant key (MCC, MID, merchant country) by adding together the entries for that merchant in each weekly summary. A given merchant key may not appear in all 16 weekly summaries. Weeks in which a merchant key does not appear can be treated as a weekly summary with zero values for all variables.

Default Raw Merchant Profiles

In the event a merchant key is not found when scoring, the preferred embodiment of the invention provides an appropriate default profile. Defaults based on MCC and merchant country code are calculated. For cases of invalid merchant category or country code, a global default profile is calculated. Within the MPB system and method, the raw default profiles are calculated by adding up the entries for each MCC/merchant country combination in the weekly summaries.

Conversion from Internal Merchant Key to External Merchant Key

The external merchant key for MPB is the combination of MCC and MID; thus there is a need for a mechanism for rolling-up merchant profiles based on the internal key, which also includes merchant country, into merchant profiles based on the external key. In most cases, there is a one-to-one correspondence between internal and external keys, so no roll-up is needed. In a small number of cases, a many-to-one correspondence between internal and external keys is expected. Most often, these cases are associated with merchants with a presence in more than one country, so it is reasonable to create a single external merchant profile for multiple internal merchant keys. The roll-up occurs at the raw merchant profile level; the raw merchant profile associated with the external key is obtained by summing the individual quantities in the merchant profiles based on the internal keys.

Final Merchant Profile Assembly

The merchant profiles that are sent to clients are constructed from the raw merchant profiles. All merchant profile variables are intensive; hence they do not just indicate the size of the merchant. Variables that compare a merchant to what is typical for the MCC-MCNTRY must not depend on counting the number of merchants in the MCC-MCNTRY. In one embodiment of the invention, the "byMCC" variables include MCC-MCNTRY defaults within each merchant profile. A model could then use the merchant and MCC-MCNTRY profiles by themselves as well as in ratios. Bad merchant ID's, i.e. consisting solely of blanks and zeros, are cleaned out at this stage.

The final merchant profile includes some "flag" variables, such as the following, for example:

Internet/MOTO/No-Device/CNP merchant indicator to give improved hour-of-week risk, i.e. early morning CNP transaction is different from early morning card-present transaction, and at-home variables, i.e. for better distance from home calculations, as well as the possibility of suppressing case creation on transactions that might be charged off in the event of fraud.

Profile-type indicator to distinguish between merchant profiles and the various types of default profiles. This could be for merchant hit-rate research. Values are full key match, MCC-MCNTRY default, global. In another embodiment of the invention, it may be desirable to refine it to indicate if MCC-MCNTRY default is used because MID is "bad" or because MID was not found.

There are eight segments used in the weekly summary calculations, but there is only room for four segments in each merchant profile. Thus an adaptive segmentation that includes the top-four segments, based on transaction count, is used. One profile slot is used to indicate the segments included in the profile. Default profiles, however, include all eight segments. The final list of merchant profiles variables are listed in Table A, hereinbelow:

TABLE A

| | |
|---|---|
| MP01 | Adaptive no. 1 segment: 4-week average of all-response fraud rate |
| MP02 | Adaptive no. 1 segment: 16-week average of all-response fraud rate |
| MP03 | Adaptive no. 1 segment: 16-week average of approved fraud rate |
| MP04 | Adaptive no. 1 segment: 16-week average of dollar-weighted approved fraud rate |
| MP05 | Adaptive no. 2 segment: 4-week average of all-response fraud rate |
| MP06 | Adaptive no. 2 segment: 16-week average of all-response fraud rate |
| MP07 | Adaptive no. 2 segment: 16-week average of approved fraud rate |
| MP08 | Adaptive no. 2 segment: 16-week average of dollar-weighted approved fraud rate |
| MP09 | Adaptive no. 3 segment: 4-week average of all-response fraud rate |
| MP10 | Adaptive no. 3 segment: 16-week average of all-response fraud rate |
| MP11 | Adaptive no. 3 segment: 16-week average of approved fraud rate |
| MP12 | Adaptive no. 3 segment: 16-week average of dollar-weighted approved fraud rate |
| MP13 | Adaptive no. 4 segment: 4-week average of all-response fraud rate |
| MP14 | Adaptive no. 4 segment: 16-week average of all-response fraud rate |
| MP15 | Adaptive no. 4 segment: 16-week average of approved fraud rate |
| MP16 | Adaptive no. 4 segment: 16-week average of dollar-weighted approved fraud rate |
| MP17 | Overall: 4-week average of all-response fraud rate |
| MP18 | Overall: 16-week average of all-response fraud rate |

TABLE A-continued

| | |
|---|---|
| MP19 | Overall: 4-week average of approved fraud rate |
| MP20 | Overall: 16-week average of approved fraud rate |
| MP21 | Overall: 4-week average of dollar-weighted fraud rate |
| MP22 | Overall: 16-week average of dollar-weighted fraud rate |
| MP23 | MCC-MCNTRY default of MP1 |
| MP24 | MCC-MCNTRY default of MP2 |
| MP25 | MCC-MCNTRY default of MP3 |
| MP26 | MCC-MCNTRY default of MP4 |
| MP27 | MCC-MCNTRY default of MP5 |
| MP28 | MCC-MCNTRY default of MP6 |
| MP29 | MCC-MCNTRY default of MP7 |
| MP30 | MCC-MCNTRY default of MP8 |
| MP31 | MCC-MCNTRY default of MP9 |
| MP32 | MCC-MCNTRY default of MP10 |
| MP33 | MCC-MCNTRY default of MP11 |
| MP34 | MCC-MCNTRY default of MP12 |
| MP35 | MCC-MCNTRY default of MP13 |
| MP36 | MCC-MCNTRY default of MP14 |
| MP37 | MCC-MCNTRY default of MP15 |
| MP38 | MCC-MCNTRY default of MP16 |
| MP39 | MCC-MCNTRY default of MP17 |
| MP40 | MCC-MCNTRY default of MP18 |
| MP41 | MCC-MCNTRY default of MP19 |
| MP42 | MCC-MCNTRY default of MP20 |
| MP43 | MCC-MCNTRY default of MP21 |
| MP44 | MCC-MCNTRY default of MP22 |
| MP45 | Adaptive no. 1 segment: 16-week average of number of approved auths |
| MP46 | Adaptive no. 2 segment: 16-week average of number of approved auths |
| MP47 | Adaptive no. 3 segment: 16-week average of number of approved auths |
| MP48 | Adaptive no. 4 segment: 16-week average of number of approved auths |
| MP49 | Overall: 16-week average of number of approved auths |
| MP50 | 4-week average of approved auth amount |
| MP51 | 16-week average of approved auth amount |
| MP52 | 4-week average of approved fraud amount |
| MP53 | 16-week average of approved fraud amount |
| MP54 | 4-week standard deviation of approved auth amount |
| MP55 | 16-week standard deviation of approved auth amount |
| MP56 | 4-week standard deviation of approved fraud amount |
| MP57 | 16-week standard deviation of approved fraud amount |
| MP58 | MCC-MCNTRY default of MP50 |
| MP59 | MCC-MCNTRY default of MP51 |
| MP60 | MCC-MCNTRY default of MP52 |
| MP61 | MCC-MCNTRY default of MP53 |
| MP62 | MCC-MCNTRY default of MP54 |
| MP63 | MCC-MCNTRY default of MP55 |
| MP64 | MCC-MCNTRY default of MP56 |
| MP65 | MCC-MCNTRY default of MP57 |
| MP66 | 1 week pick-up rate |
| MP67 | 4-week average of pick-up rate |
| MP68 | MCC-MCNTRY default of MP66 |
| MP69 | MCC-MCNTRY default of MP67 |
| MP70 | segmentation/look up indicator |

For default profiles, the variables are listed in Table B, hereinbelow:

TABLE B

| | |
|---|---|
| MP01 | domestic/swipe/no pin: 4-week average of all-response fraud rate |
| MP02 | domestic/swipe/no pin: 16-week average of all-response fraud rate |
| MP03 | domestic/swipe/no pin: 16-week average of approved fraud rate |
| MP04 | domestic/swipe/no pin: 16-week average of dollar-weighted approved fraud rate |
| MP05 | domestic/swipe/with pin: 4-week average of all-response fraud rate |
| MP06 | domestic/swipe/with pin: 16-week average of all-response fraud rate |
| MP07 | domestic/swipe/with pin: 16-week average of approved fraud rate |
| MP08 | domestic/swipe/with pin: 16-week average of dollar-weighted approved fraud rate |
| MP09 | domestic/fallback/key: 4-week average of all-response fraud rate |
| MP10 | domestic/fallback/key: 16-week average of all-response fraud rate |
| MP11 | domestic/fallback/key: 16-week average of approved fraud rate |
| MP12 | domestic/fallback/key: 16-week average of dollar-weighted approved fraud rate |
| MP13 | domestic/fallback/chip: 4-week average of all-response fraud rate |
| MP14 | domestic/fallback/chip: 16-week average of all-response fraud rate |
| MP15 | domestic/fallback/chip: 16-week average of approved fraud rate |
| MP16 | domestic/fallback/chip: 16-week average of dollar-weighted approved fraud rate |
| MP17 | domestic/card not present: 4-week average of all-response fraud rate |
| MP18 | domestic/card not present: 16-week average of all-response fraud rate |
| MP19 | domestic/card not present: 16-week average of approved fraud rate |
| MP20 | domestic/card not present: 16-week average of dollar-weighted approved fraud rate |
| MP21 | domestic/chip: 4-week average of all-response fraud rate |
| MP22 | domestic/chip: 16-week average of all-response fraud rate |
| MP23 | domestic/chip: 16-week average of approved fraud rate |
| MP24 | domestic/chip: 16-week average of dollar-weighted approved fraud rate |
| MP25 | foreign/card present: 4-week average of all-response fraud rate |
| MP26 | foreign/card present: 16-week average of all-response fraud rate |
| MP27 | foreign/card present: 16-week average of approved fraud rate |
| MP28 | foreign/card present: 16-week average of dollar-weighted approved fraud rate |
| MP29 | foreign/card not present: 4-week average of all-response fraud rate |
| MP30 | foreign/card not present: 16-week average of all-response fraud rate |
| MP31 | foreign/card not present: 16-week average of approved fraud rate |
| MP32 | foreign/card not present: 16-week average of dollar-weighted approved fraud rate |
| MP33 | Overall: 4-week average of all-response fraud rate |
| MP34 | Overall: 16-week average of all-response fraud rate |
| MP35 | Overall: 4-week average of approved fraud rate |
| MP36 | Overall: 16-week average of approved fraud rate |
| MP37 | Overall: 4-week average of dollar-weighted fraud rate |
| MP38 | Overall: 16-week average of dollar-weighted fraud rate |
| MP39 | domestic/swipe/no pin: 16-week average of number of approved auths |
| MP40 | domestic/swipe/with pin: 16-week average of number of approved auths |
| MP41 | domestic/fallback/key: 16-week average of number of approved auths |
| MP42 | domestic/fallback/chip: 16-week average of number of approved auths |
| MP43 | domestic/card not present: 16-week average of number of approved auths |
| MP44 | domestic/chip: 16-week average of number of approved auths |
| MP45 | foreign/card present: 16-week average of number of approved auths |
| MP46 | foreign/card not present: 16-week average of number of approved auths |
| MP47 | Overall: 16-week average of number of approved auths |
| MP48 | filler |
| MP49 | filler |
| MP50 | 4-week average of approved auth amount |
| MP51 | 16-week average of approved auth amount |
| MP52 | 4-week average of approved fraud amount |
| MP53 | 16-week average of approved fraud amount |
| MP54 | 4-week standard deviation of approved auth amount |
| MP55 | 16-week standard deviation of approved auth amount |
| MP56 | 4-week standard deviation of approved fraud amount |
| MP57 | 16-week standard deviation of approved fraud amount |
| MP58 | MCC-MCNTRY default of MP50 (repeated) |
| MP59 | MCC-MCNTRY default of MP51 (repeated) |
| MP60 | MCC-MCNTRY default of MP52 (repeated) |
| MP61 | MCC-MCNTRY default of MP53 (repeated) |
| MP62 | MCC-MCNTRY default of MP54 (repeated) |
| MP63 | MCC-MCNTRY default of MP55 (repeated) |

TABLE B-continued

| | |
|---|---|
| MP64 | MCC-MCNTRY default of MP56 (repeated) |
| MP65 | MCC-MCNTRY default of MP57 (repeated) |
| MP66 | 1 week pick-up rate |
| MP67 | 4-week average of pick-up rate |
| MP68 | MCC-MCNTRY default of MP66 (repeated) |
| MP69 | MCC-MCNTRY default of MP67 (repeated) |
| MP70 | segmentation/look up indicator |

An Exemplary Implementation in a Model

Following is a description of an exemplary implementation in a model according to the preferred embodiment of the invention. It should be appreciated that one of ordinary skill in the art can and should discern that specific details are by way of example only and are not meant to be limiting.

Within a model, the power of the merchant profiles is enhanced by use of a so-called cross profile. This is a section of the cardholder profile that tracks averages and maximum values seen by the cardholder in the merchant profiles.

A potential set of cross profiles is provided as follows in Table C hereinbelow:

TABLE C

FPP_TREND_MRCH_COND_TRN_APPR_FRATE_16WK_5E
FPP_TREND_MRCH_PICKUPRATE_1WK_40E
FPP_MRCH_FRATE_OVERALL_16WK_5E
FPP_MRCH_FRATE_OVERALL_16WK_40E
FPP_MAX_MRCH_FRATE_OVERALL_16WK_2D
FPP_MAXP_MRCH_TRN_APPR_FRATE_OVERALL_4WK_6M
FPP_MAXB_MRCH_TRN_APPR_FRATE_OVERALL_4WK_6M
FPP_MAXM_MRCH_TRN_APPR_FRATE_OVERALL_4WK_6M
FPP_MAX_MRCH_TRN_APPR_FRATE_OVERALL_4WK_2D
FPP_MRCH_TRN_APPR_FRATE_OVERALL_16WK_5E
FPP_MRCH_TRN_APPR_FRATE_OVERALL_16WK_40E
FPP_MAXP_MRCH_TRN_APPR_FRATE_OVERALL_16WK_6M
FPP_MAXB_MRCH_TRN_APPR_FRATE_OVERALL_16WK_6M
FPP_MAXM_MRCH_TRN_APPR_FRATE_OVERALL_16WK_6M
FPP_MAX_MRCH_TRN_APPR_FRATE_OVERALL_16WK_2D
FPP_MAXP_MRCH_DOL_APPR_FRATE_OVERALL_16WK_6M
FPP_MAXB_MRCH_DOL_APPR_FRATE_OVERALL_16WK_6M
FPP_MAXM_MRCH_DOL_APPR_FRATE_OVERALL_16WK_6M
FPP_MAX_MRCH_DOL_APPR_FRATE_OVERALL_16WK_2D
FPP_MAX_MRCH_DOL_APPR_FRATE_OVERALL_16WK_BYMCC_2D
FPP_MRCH_COND_FRATE_16WK_5E
FPP_MAX_MRCH_COND_FRATE_16WK_2D
FPP_MAXP_MRCH_COND_FRATE_16WK_BYMCC_6M
FPP_MAXB_MRCH_COND_FRATE_16WK_BYMCC_6M
FPP_MAXM_MRCH_COND_FRATE_16WK_BYMCC_6M
FPP_MAX_MRCH_COND_FRATE_16WK_BYMCC_2D
FPP_MRCH_COND_TRN_APPR_FRATE_16WK_5E
FPP_MAX_MRCH_COND_TRN_APPR_FRATE_16WK_2D
FPP_MRCH_COND_DOL_APPR_FRATE_16WK_5E
FPP_MRCH_COND_DOL_APPR_FRATE_16WK_40E
FPP_MAX_MRCH_AVG_APPR_DOL_4WK_2D
FPP_MRCH_AVG_APPR_DOL_16WK_40E
FPP_MAXP_MRCH_AVG_APPR_DOL_16WK_6M
FPP_MAXB_MRCH_AVG_APPR_DOL_16WK_6M
FPP_MAXM_MRCH_AVG_APPR_DOL_16WK_6M
FPP_MAX_MRCH_AVG_APPR_DOL_16WK_2D
FPP_MAX_MRCH_AVG_APPR_DOL_4WK_BYMCC_2D
FPP_MRCH_AVG_APPR_DOL_16WK_BYMCC_5E
FPP_MAX_MRCH_AVG_APPR_DOL_16WK_BYMCC_2D
FPP_MRCH_AVG_APPR_FRD_DOL_4WK_BYMCC_40E
FPP_MRCH_PICKUPRATE_1WK_40E
FPP_MRCH_PICKUPRATE_4WK_5E
FPP_MAXP_MRCH_PICKUPRATE_4WK_6M
FPP_MAXB_MRCH_PICKUPRATE_4WK_6M
FPP_MAXM_MRCH_PICKUPRATE_4WK_6M
FPP_MAX_MRCH_PICKUPRATE_4WK_2D
FPP_MRCH_PICKUPRATE_4WK_BYMCC_5E
FPP_N_DOL_AMTxMRCH_AVG_APPR_DOL_16WK_NMN_5E
FPP_N_DOL_AMTxMRCH_AVG_APPR_DOL_16WK_NMN_40E
FPP_MAXP_N_DOL_AMTxMRCH_AVG_APPR_DOL_16WK_NMN_6M
FPP_MAXB_N_DOL_AMTxMRCH_AVG_APPR_DOL_16WK_NMN_6M
FPP_MAXM_N_DOL_AMTxMRCH_AVG_APPR_DOL_16WK_NMN_6M
FPP_MAX_N_DOL_AMTxMRCH_AVG_APPR_DOL_16WK_NMN_2D
FPP_MRCH_SDEVS_DOL_AVG_APPR_DOL_4WK_5E
FPP_MRCH_SDEVS_DOL_AVG_APPR_DOL_4WK_40E

These cross profile variables can be understood with the following descriptions:

Trend means taking a running average of the differences between a current variable value and the prior average, excluding the current value, of the variable.

5E and 40E mean that an exponentially weighted average is being calculated over the cardholder's transactions or "events", using 5-event or 40-event decay constants.

MAX ... _2D means that the maximum value seen by the cardholder is calculated. But at the time of each transaction, the prior maximum is first exponentially decayed, based on the amount of time from the prior transaction and a 2-day decay constant, before being compared to the new value.

MAXM, MAXB, and MAXP (with 6-month decays) are maxima that are protected to various degrees. A protected maximum is a maximum that excludes the most recent cardholder behavior. MAXM has no protection, MAXB is the maximum excluding the most recent week, and MAXP is the maximum excluding the two most recent weeks.

BYMCC means that the merchant profile value has been normalized, e.g. divided, by the merchant-category-code/merchant-country-code default value. Merchant Category code is a standard field provided for each authorization and provides a summary indication of the type of goods the Merchant sells. For example, some of the codes correspond to "Unattended Gas Stations" or "Jewelery Stores" or "Department Stores". The Merchant Country Code is a numeric that indicates the Country of origin of the Merchant. For example, the numeric "840" indicates that the United States as country of origin of the Merchant. These variables compare a merchant to its peers.

MRCH_SDEVS_DOL_AVG_APPR_DOL takes the difference between the transaction amount and the average approved transaction amount for that merchant. The absolute value of the difference is taken, and the result is divided by the standard deviation of the approved transaction amounts at the merchant. These variables give the number of standard deviations from average.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method comprising:
receiving, from a financial institution or an association of financial institutions, a payment card authorization data set comprising authorized transactions;
receiving a daily fraud data set comprising transactions that are determined to be fraud;
comparing the authorized transactions in the payment card authorization data set with the transactions in the daily fraud data set to identify matching transactions that are in both the payment card authorization data set and the daily fraud data set;
generating an authorization extract file, the authorization extract file sorted by a merchant key;
generating one or more fraud authorization files comprising the identified matching transactions, the one or more fraud authorization files sorted by the merchant key;
compiling a first set of statistics for each merchant for each week by applying the generated authorization extract file, the compiled statistics used to generate a weekly summary authorization data set;
compiling a second set of statistics for each merchant for each week by applying the generated fraud authorization extract file, the compiled statistics used to generate a weekly summary fraud authorization data set;
combining the weekly summary authorization data set of each week in a predetermined number of most recent weeks to obtain a combined weekly summary authorization data set;
combining the weekly summary fraud authorization data set of each week in the predetermined number of most recent weeks to obtain a combined weekly summary fraud authorization data set;
compiling, based on data in the combined weekly summary authorization data set, a third set of statistics;
compiling, based on data in the combined weekly summary fraud authorization data set, a fourth set of statistics;
generating, based on the weekly summary authorization data set and the weekly summary fraud authorization data set, a merchant profile data set, the merchant profile data set stored for use-in the fraud prediction system; and
generating, based on the third set of statistics and the fourth set of statistics, a default merchant profile data set, the default profile data set stored for use in the fraud prediction system;
scoring a new transaction based on at least one of the merchant profile data set and the default profile data set, the scoring being performed in real-time when the new transaction occurs, the scoring generating a score characterizing a likelihood of the new transaction being fraudulent;
transmitting the score to an entity involved in the new transaction, the score indicating whether the new transaction should be completed;
placing each transaction out of the matching transactions into segments based on whether the transaction is cross border or domestic and card present or card not present, and based on point-of-sale entry mode; and
providing adaptive segmentation by which only the profile variables for the most popular segments are transmitted in the merchant's profile,
wherein the most popular segments comprise a predetermined number of segments that have a greater number of transactions than other segments.

2. The method of claim 1, wherein the first set of statistics and the second set of statistics comprise merchant profile variables that are intensive variables, the intensive variables being independent of the size of the merchant.

3. The method of claim 2, wherein the merchant profile variables comprise:
fraud rate that represents a fraction of transactions that are fraud,
pick-up rate that represents a fraction of the transactions that have a pick-up response code,
average of amounts of the transactions, and
standard-deviation of the amounts of transactions.

4. The method of claim 3, wherein the fraud rate is based on whether the transaction is keyed or swiped and whether the transaction is a cross-border transaction.

5. The method of claim 3, further comprising:
calculating the fraud rate by dividing a first average of the transactions in daily fraud data sets over a first time period by a second average of the transactions in payment card authorization data sets over the first time period.

6. The method of claim 1, further comprising:
generating merchant profile variables based on merchant country code; and
generating merchant default profile variables based on merchant category code (MCC) and on merchant country code.

7. The method of claim 6, further comprising:
transmitting MCC-merchant-country default as part of each merchant profile.

8. The method of claim 1, further comprising:
giving equal weight to data of each week from the predetermined number of most recent weeks, and
removing, based on the weight, data from older weeks from the combined weekly summary authorization data set and the combined weekly summary authorization data set.

9. The method of claim 1, further comprising:
placing each transaction out of the matching transactions into one of the following segments for which to calculate independent sets of statistics:
cross border, card not present;
cross border, card present;
domestic, card not present;
domestic, card present, chip entry mode;
domestic, card present, swiped entry mode without PIN;
domestic, card present, swiped entry mode with PIN;
domestic, card present, chip fallback entry mode; and
domestic, card present, keyed or unknown entry mode; and
calculating the third set of statistics and the fourth set of statistics for each of the segments.

10. The method of claim 1, further comprising:
transmitting a segmentation indicator that indicated the segments that are adaptively selected and in slots in which the adaptively selected segments reside.

11. The method of claim 1, further comprising:
providing a maximum limit on number of declines of a particular transaction that is analyzed.

12. The method of claim 1, further comprising:
generating conditional fraud rates which are rates defined separate fraud rates for separate characteristics.

13. The method of claim 1, further comprising:
synchronizing the authorizations and fraud authorizations based on their respective transaction dates and ensuring the fraud authorization count in a numerator and the authorization count in a denominator come from the same time period.

14. The method of claim 1, further comprising:
providing bounds on a number of declines that are analyzed.

15. A non-transitory computer program product storing instructions that, when executed by at least one programmable processor, cause the at least one programmable processor to perform operations comprising:
receiving from a financial institution or an association of financial institutions, a payment card authorization data set comprising authorized transactions;
receiving a daily fraud data set comprising transactions that are determined to be fraud;
comparing the authorized transactions in the payment card authorization data set with the transactions in the daily fraud data set to identify matching transactions that are in both the payment card authorization data set and the daily fraud data set;
generating an authorization extract file, said authorization extract file sorted by a merchant key;
generating one or more fraud authorization files comprising the identified matching transactions, said one or more fraud authorization files sorted by the merchant key;
compiling a first set of statistics for each merchant for each week by applying the generated authorization extract file, the compiled statistics used to generate a summary authorization data set;
compiling a second set of statistics for each merchant for each week by applying the generated fraud authorization extract file, the compiled statistics used to generate a summary fraud authorization data set;
combining the summary authorization data set of each week in a predetermined number of most recent weeks to obtain a combined summary authorization data set;
combining the summary fraud authorization data set of each week in the predetermined number of most recent weeks to obtain a combined summary fraud authorization data set;
compiling, based on data in the combined summary authorization data set, a third set of statistics;
compiling, based on data in the combined summary fraud authorization data set, a fourth set of statistics;
generating, based on the summary authorization data set and the summary fraud authorization data set, a merchant profile data set, said merchant profile data set stored for use in the fraud prediction system;
generating, based on the third set of statistics and the fourth set of statistics, a default merchant profile data set, said default profile data set stored for use in the fraud prediction system;
scoring a new transaction based on at least one of the merchant profile data set and the default profile data set, the scoring being performed in real-time when the new transaction occurs, the scoring generating a score characterizing a likelihood of the new transaction being fraudulent;
transmitting the score to an entity involved in the new transaction, the score indicating whether the new transaction should be completed,
wherein the merchant key refers to one of an external key and an internal key,
the external key comprising: a merchant category code and a merchant identifier,
the internal key comprising the merchant category code, the merchant identifier, and the merchant country code, the internal key associated with merchant's profile, and
wherein the merchant profile is by default looked up using the external key, and
wherein the merchant profile is looked up using the internal key when the default look up does not provide the merchant profile;
placing each transaction out of the matching transactions into segments based on whether the transaction is cross border or domestic, card present or card not present, and based on point-of-sale entry mode; and
providing adaptive segmentation by which only the profile variables for the most popular segments are transmitted in the merchant's profile,
wherein the most popular segments comprise a predetermined number of segments that have a greater number of transactions than other segments.

* * * * *